(12) United States Patent
Cao

(10) Patent No.: US 8,971,301 B2
(45) Date of Patent: Mar. 3, 2015

(54) FAST ROUND-TRIP DELAY DELIVERY OF DATAGRAMS OVER A WIRELESS NETWORK

(75) Inventor: Carl Cao, Milpitas, CA (US)

(73) Assignee: Optis Wireless Technology, LLC, Plano, TX (US)

( * ) Notice: Subject to any disclaimer, the term of this patent is extended or adjusted under 35 U.S.C. 154(b) by 530 days.

(21) Appl. No.: 12/916,947

(22) Filed: Nov. 1, 2010

(65) Prior Publication Data

US 2012/0106462 A1    May 3, 2012

(51) Int. Cl.
*H04W 4/00* (2009.01)
*H04W 76/00* (2009.01)

(52) U.S. Cl.
CPC ..................................... *H04W 76/00* (2013.01)
USPC ............................ 370/338; 370/329; 370/230

(58) Field of Classification Search
None
See application file for complete search history.

(56) References Cited

U.S. PATENT DOCUMENTS

| | | | | |
|---|---|---|---|---|
| 7,774,008 | B2 * | 8/2010 | Benaouda et al. | 455/466 |
| 2005/0227718 | A1 * | 10/2005 | Harris et al. | 455/509 |
| 2011/0249636 | A1 * | 10/2011 | Cherian et al. | 370/329 |

FOREIGN PATENT DOCUMENTS

| | | |
|---|---|---|
| WO | WO 98/02005 A1 | 1/1998 |
| WO | WO 2004/114144 A1 | 12/2004 |

OTHER PUBLICATIONS

3GPP, 3$^{rd}$ Generation Partnership Project; Technical Specification Group Services and System Aspects; System Improvements for Machine-Type Communications; (Release 10). 3GPP TR 23.888 v0.2.1 (Jan. 2010).

* cited by examiner

*Primary Examiner* — John Blanton
*Assistant Examiner* — Tito Pham
(74) *Attorney, Agent, or Firm* — Vincent J. Allen; Austin C. Teng; Carstens & Cahoon, LLP

(57) ABSTRACT

An entity, such as a base station or a Radio Network Controller, of a wireless telecommunications network having a mobile station and a remote server includes a network interface which receives a datagram from the mobile station. The entity includes a memory in communication with the network interface. The entity includes a processing unit in communication with the memory which stores in the memory the mobile station location, and which sends a response received from the remote server regarding the datagram to the mobile station from the network interface using the mobile station's location in the memory prior to a wireless connection with the mobile station being established. The entity may include a processing unit that recognizes the received datagram is for Machine-to-Machine Applications and requiring Sub 100 Millisecond Datagram and Response Delivery.

27 Claims, 6 Drawing Sheets

FAST ROUND-TRIP DELAY DELIVERY OF DATAGRAMS OVER A WIRELESS NETWORK

TECHNICAL FIELD

The present invention is related to the transmission of a datagram from a mobile station in a wireless telecommunications network which receives a response from a remote server prior to a wireless connection with the mobile station being established. (As used herein, references to the "present invention" or "invention" relate to exemplary embodiments and not necessarily to every embodiment encompassed by the appended claims.) More specifically, the present invention is related to the transmission of a datagram from a mobile station in a wireless telecommunications network which receives a response from a remote server prior to a wireless connection with the mobile station being established where the mobile station supports Machine-to-Machine Application and requires Sub 100 Millisecond Datagram and Response Delivery.

BACKGROUND

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

Ubiquity of machine-to-machine (M2M) applications prevents maintaining many wireless devices in the always connected state due to the great number of connection resources needed, and the resulting denial of such resources to other devices to do otherwise.

Applications of these devices need short round-trip delay (RTD), e.g., approximately 100 ms or less; such applications include, but are not limited to, traffic control, gaming, location tracking, real-time machinery control, etc.

Setting up the full wireless connection will take longer than the required response time as they do not need long connected time or transfer a large amount of data, but connect quickly and may connect frequently.

In fact, most such applications complete within a single 3-way handshake of datagrams and the connection resource should immediately be freed. The device can send a connection close message to the wireless network, immediately after it has sent its acknowledgement of receiving the response from the remote server. Alternatively, the network can also send a connection close message to the wireless device, after a few seconds of inactivity between the device and the network (as it is currently done normally).

Actual wireless connections (depicted in FIG. 1) are a specialized technical term and a limited resource within a wireless network. An almost unlimited number of devices can be in the Idle State, i.e., listening to the network activities and network broadcast system information infrequently, but otherwise take no action. A larger number of devices may be in the Dormant State that occupies some resources such as shared or dedicated periodic transmission resources. Note, the Dormant State may also be variously named as Hold State, Suspended State, Cell_FACH State, etc. in different wireless technology, but they are commonly characterized by the fact that the wireless device and the wireless network already allocates the over-the-air and terrestrial network resources, but typically not a dedicated physical wireless connection. There can be a finite and relatively small number of devices in the connected State, where the device possesses full over-the-air and terrestrial network resources. In this state, the device can transmit data immediately to the network and vice versa.

This invention reduces the round-trip delay (RTD) of datagram exchanges between the wireless device and the remote server to approximately one hundred milliseconds or less.

If the device is initially in the Idle State, the reduction may be a few hundred milliseconds. If in the Hold State, the reduction is smaller, and may be tens of milliseconds to 100 milliseconds. The device sends the datagram over the (common) access channel (ACH) piggy-backed on the initial connection setup request. As the connection setup procedure requires, the device and the wireless network are already in a state to listen to the transmission of the wireless network throughout the connection setup process. The wireless network transmits the server response immediately over the (common) control channel (CCH), again piggy-backed on the traffic channel assignment (TCA) message, and thus avoiding any wait-time for the completion of the connection setup for the initial datagram exchange.

Examples of Supported Applications: Traffic Light Control

In certain jurisdictions, public transport vehicles are assigned privileges such that, for example, when a bus approaches a junction, an on-site traffic control device senses the approaching bus. The device sends a message to the remote traffic control server under the management of the said jurisdiction to signal that a bus is near the junction. Part of the privileges affords that the bus should proceed without stopping. The remote traffic control server is programmed such that it responds with an instruction, as encapsulated in a datagram, to turn the light in the direction of the bus Green and similarly lights in other directions Red. The bus does not stop or only needs to slow briefly, and can cross the junction with privilege ahead of other traffic. From the time the on-site traffic control device sends the message to the time that the instruction in response is received, the round trip delay (RTD) is required to be within tens of milliseconds, and with reliability of 95%.

There are four existing solutions for delivering machine-to-machine datagram exchanges:

Waiting for Connection Setup Completion: The wireless device initiates a connection setup with the wireless network, and waits for the connection to be fully set up to deliver the response from the remote server. This is shown in FIG. 2. (Note, in this method, we assume that the device can send the initial datagram over the ACH as uplink Data-over-Signaling, which is the more optimistic case by this method, and more efficient than waiting until the connection setup to deliver the datagram.)

The connection setup can take an additional 100 to 500 milliseconds, depending on the wireless technology, before the response can be delivered to the wireless device.

Base Station (BTS) Quick Connect: A variant of the first method is as illustrated in FIG. 3; once the device sends a connection request (which may or may not be together with uplink Data-over-Signaling), the connection is setup immediately at the BTS without involving a radio network controller (RNC), and thus eliminating the delays incurred over the backhaul network between the BTS and the central offices where the RNC is located. This has the benefit of expediting connection setup, but actual data exchange still has to wait until the completion of the connection setup.

Downlink Data-over-Signaling: The datagram exchange between the wireless device and the remote server can all be accomplished by sending the initial datagram from the device as a uplink Data-over-Signaling (DoS) message, which is encapsulated in a signaling message over common wireless channels, and the response from the server over downlink DoS on the common control channel (CCH), and without needing the setup of a connection between the device and the wireless network.

This solution is suboptimal as the downlink DoS message fails to exploit the reciprocity of the datagram exchange, and may involve sending the downlink DoS to the whole paging area of the device. Additionally sending these datagrams over the downlink DoS is a potential waste of common signaling resources as a large number of these, and over a large paging area, may be needed.

Wireless Technology Optimization: The wireless technology may be optimized in several ways to improve connection setup speed, and the wait-time for the initial datagram to begin transmission. For example, the device may be held in a more advanced state than Dormant State, e.g., a shared-dedicated state, whereby it can immediately send the datagram over the allocated resources with minimal contention or loss of reliability. Another example is to enhance the time-division multiplexing timing characteristics of the system such that each exchange in the connection setup process is faster.

This solution is possible for new wireless technologies, e.g., 3GPP Long-Term Evolution (LTE), but it is limited in existing wireless technologies, e.g., CDMA HRPD (or HRPD) and 3GPP UMTS, because such solutions typically entail significant system redesigns and additional changes have to be incorporated into the fundamental physical layer characteristics of the system.

BRIEF SUMMARY OF THE INVENTION

The present invention pertains to an entity of a wireless telecommunications network having a mobile station and a remote server. The entity comprises a network interface which receives a datagram from the mobile station. The entity comprises a memory in communication with the network interface. The entity comprises a processing unit in communication with the memory which stores in the memory the mobile stations location, and which sends a response received from the remote server regarding the datagram to the mobile station from the network interface using the mobile station's stored location in the memory prior to a wireless connection with the mobile station being established.

The present invention pertains to a method of an entity in a wireless telecommunications network having a mobile station and a remote server. The method comprises the steps of receiving at a network interface a datagram from the mobile station. There is the step of storing by a processing unit in a memory the mobile station's location. There is the step of sending a response received from the remote server regarding the datagram to the mobile station from the network interface using the mobile station's stored location in the memory prior to a wireless connection with the mobile station being established.

BRIEF DESCRIPTION OF THE DRAWINGS

In the accompanying drawings, the preferred embodiment of the invention and preferred methods of practicing the invention are illustrated in which.

DETAILED DESCRIPTION

Figure 6:
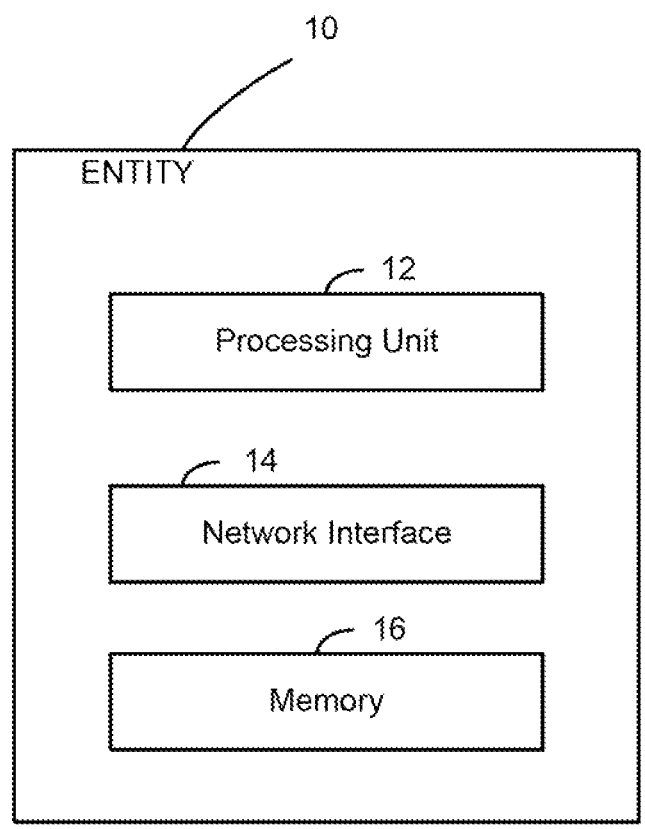
FIG. 6 is a block diagram of the entity of the present invention.

Referring now to the drawings wherein like reference numerals refer to similar or identical parts throughout the several views, and more specifically to FIG. 6 thereof, there is shown an entity 10 of a wireless telecommunications network having a mobile station and a remote server. The entity 10 comprises a network interface 14 which receives a datagram from the mobile station. The entity 10 comprises a memory 16 in communication with the network interface 14. The entity 10 comprises a processing unit 12 in communication with the memory 16 which stores in the memory 16 the mobile stations location, and which sends a response received from the remote server regarding the datagram to the mobile station from the network interface 14 using the mobile station's stored location in the memory 16 prior to a wireless connection with the mobile station being established. The entity 10 may be a Radio Network Controller (RNC) or a Base Station (BTS).

The network interface 14 may forward the datagram to the remote server, and which receives the response from the remote server. The network interface 14 may send the response with a traffic channel assignment message to the mobile station. The network interface 14 may bundle together the response with the traffic channel assignment message for transmission over a forward link common control channel, or a downlink control channel, or a shared downlink control channel. The processing unit 12 may retrieve from a network database of the mobile station a Machine-to-Machine Application attribute, retrieve from the network database of the mobile station a Sub 100 Millisecond Datagram and Response Delivery attribute, store the Machine-to-Machine Application attribute and the Sub 100 Millisecond Datagram and Response Delivery attribute in memory 16, and recognize that the mobile station supports Machine-to-Machine Application and requires Sub 100 Millisecond Datagram and Response Delivery.

The processing unit 12 may store the attributes for the mobile station (MS) session ID in the memory 16 through provisioning or configuration; recognizes that the MS session ID supports Machine-to-Machine Application and recognizes that the MS session ID requires Sub 100 Millisecond Datagram and Response Delivery. The processing unit 12 may recognize that an ESN, MEID, IMSI, or IMEI ID designates that the MS supports Machine-to-Machine Application and requires Sub 100 Millisecond Datagram and Response Delivery. The processing unit 12 may withhold the traffic channel assignment message to ensure the response is bundled with the traffic channel assignment message.

The network interface 14 may receive signaling attributes indicating that the datagram shall be treated as Machine-to-Machine Application and requires Sub 100 Millisecond Datagram and Response Delivery along with the datagram. The network interface 14 may receive the datagram encapsulated with a connection resource request. The processing unit 12 may ensure that any data received for the mobile station does not wait for the connection with the mobile station to be established. The network interface 14 may receive a response acknowledgment from the mobile station after the mobile station has received the response. The network interface 14 may receive a connection close message from the mobile station when there is no longer any data to exchange. The network interface 14 may transmit data to the mobile station without need for paging.

The present invention pertains to a method of an entity 10 in a wireless telecommunications network having a mobile station and a remote server. The method comprises the steps of receiving at a network interface 14 a datagram from the mobile station. There is the step of storing by a processing unit 12 in a memory 16 the mobile station's location. There is the step of sending a response received from the remote server regarding the datagram to the mobile station from the network interface 14 using the mobile station's stored location in the memory 16 prior to a wireless connection with the mobile station being established.

There may be the step of forwarding the datagram to the remote server from the network interface 14, and receiving the response from the remote server by the network interface 14. The sending step may include the step of sending the response with a traffic channel assignment message from the network interface 14 to the mobile station. The sending the response step may include the step of bundling together the response with the traffic channel assignment message for transmission over a forward link common control channel, or a downlink control channel, or a shared downlink control channel. There may be the steps of the steps of the processing unit 12 retrieving from a network database of the mobile station a Machine-to-Machine Application attribute; retrieving from the network database of the mobile station a Sub 100 Millisecond Datagram and Response Delivery attribute; storing the Machine-to-Machine Application attribute and the Sub 100 Millisecond Datagram and Response Delivery attribute in the memory 16; and recognizing that the mobile station supports Machine-to-Machine Application and requires Sub 100 Millisecond Datagram and Response Delivery.

There may be the steps of the processing unit 12 storing in the memory 16 the attributes for a corresponding mobile station (MS) session ID through provisioning or configuration; recognizing that the MS session ID supports Machine-to-Machine Application; and recognizing that the MS session ID requires Sub 100 Millisecond Datagram and Response Delivery. There may be the step of the processing unit 12 recognizing that an ESN, MEID, IMSI, or IMEI device ID designates that the MS supports Machine-to-Machine Application and requires Sub 100 Millisecond Datagram and Response Delivery. There may be the step of the processing unit 12 withholding the traffic channel assignment message to ensure the response is bundled with the traffic channel assignment message.

The step of receiving at the network interface 14 the datagram may include the steps of a wireless protocol or technology providing signaling attributes in the connection request to designate that the MS access request to the network supports Machine-to-Machine Application and requires Sub 100 Millisecond Datagram and Response Delivery, and receiving a signaling indication that the datagram shall be treated as Machine-to-Machine Application and requires Sub 100 Millisecond Datagram and Response Delivery along with the datagram. The receiving at the network interface 14 the datagram step may include the step of receiving at the network interface 14 the datagram encapsulated with a connection resource request.

The receiving at the network interface 14 the datagram step may include the step of receiving at the network interface 14 the datagram encapsulated with a connection resource request and the Machine-to-Machine Application and requires Sub 100 Millisecond Datagram and Response Delivery indication. There may be the step of ensuring with the processing unit 12 that any data received for the mobile station does not wait for the connection with the mobile station to be established. There may be the step of receiving at the network interface 14 a response acknowledgment from the mobile station after the mobile station has received the response. There may be the step of receiving a connection close message at the network interface 14 from the mobile device when there is no longer any data to exchange. There may be the step of transmitting data by the network interface 14 to the mobile station without need for paging.

In the operation of the invention, the present invention ensures that wireless devices conserve connection resources when completing a 3-way datagram exchange with a remote server, over a wireless network, e.g., CDMA HRPD, in the shortest round trip delay (RTD) with a remote server.

A wireless device delivers a datagram to a remote server over the (random) access channel (ACH) and waits for the response from a remote server in shortest round-trip delay (RTD) possible.

The response is piggy-backed on the traffic channel assignment (TCA) message to the device from the wireless network, or any other common control channel (CCH) messages, which are part of the connection setup procedure of the wireless technology.

The round trip of the first data exchange is expedited; with no additional data to send and/or to receive, the connection is quickly released by either the wireless device or the network, which becomes available immediately for other users.

Note, for this category of devices, the datagram exchange is reciprocal between the wireless device and the remote server. It entails that the wireless network shall expect to deliver a response datagram to the device, the location of the device is known to the network, with no paging necessary. Thus, the invention enables machine-to-machine (M2M) applications that require short round trip delay.

Figure 1:
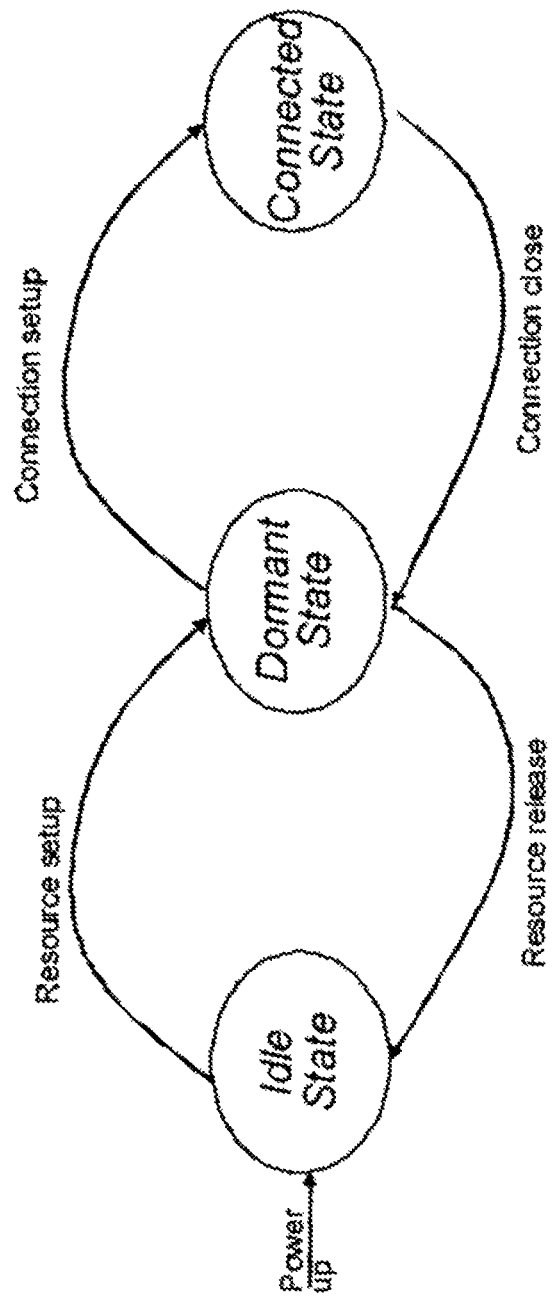
FIG. 1 shows a mobile station (MS) connection state machine and state transitions.

FIG. 1 shows a mobile station (MS) connection state machine and state transitions. Idle state represents the MS consumes no network resources, but takes very long to transmit (and to receive). Dormant state represents the MS consumes some network resources, but takes longer to transmit and to receive. Connected state represents the MS is allocated all necessary network resources to transmit and to receive.

Figure 2:
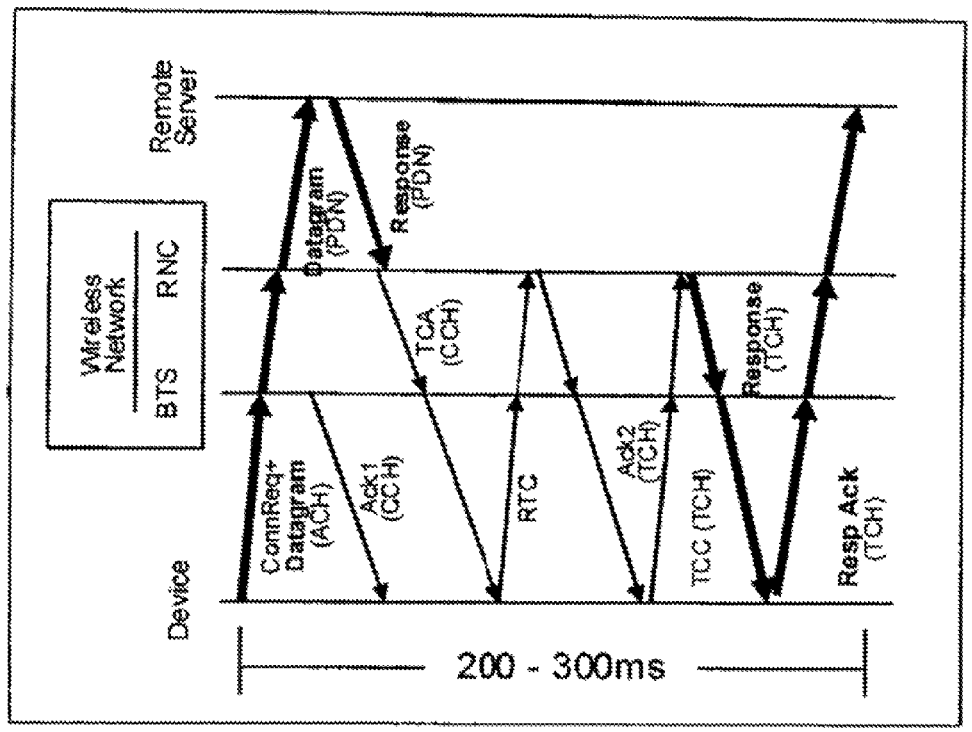
FIG. 2 shows delivery of the datagram and response over the current mobile networks, for example, CDMA HRPD.

FIG. 2 shows delivery of the datagram and response over the current mobile networks, for example, CDMA HRPD. As shown, the first datagram may be delivered to the remote server at the time of connection setup request, but the response will not be delivered until a full connection has been set up.

Figure 3:
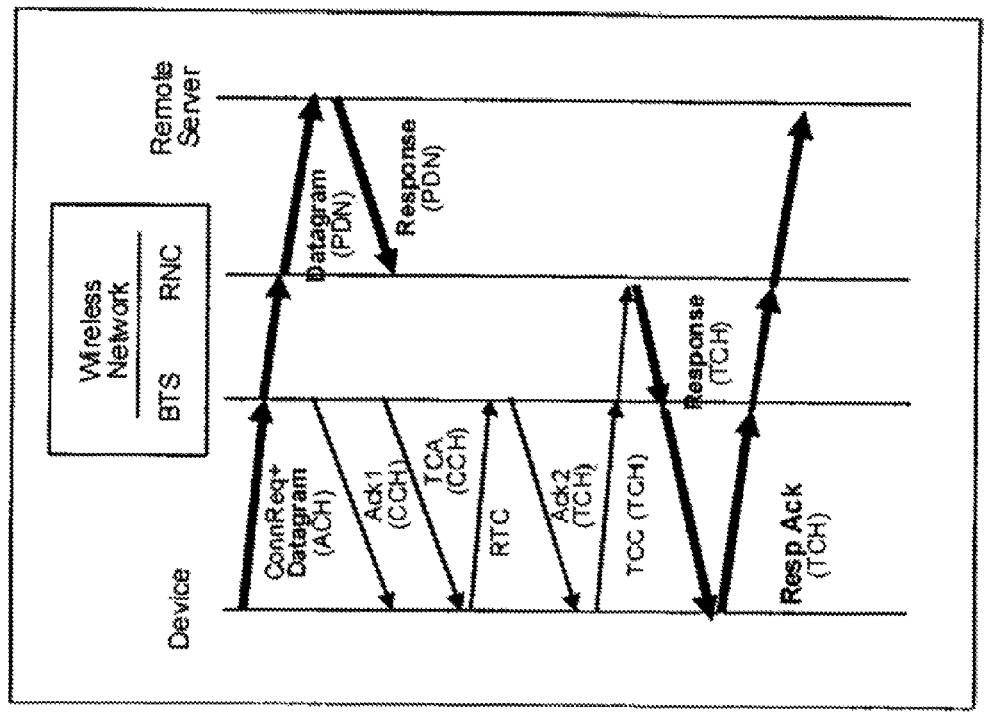
FIG. 3 shows delivery of the datagram and response with base-station (BTS) quick connect.

FIG. 3 shows delivery of the datagram and response with base-station (BTS) quick connect. As shown in this method, the BTS itself proceeds to set up the connection with the MS, thus reduces the connection setup time to speed up the delivery of the remote server response.

Figure 4:
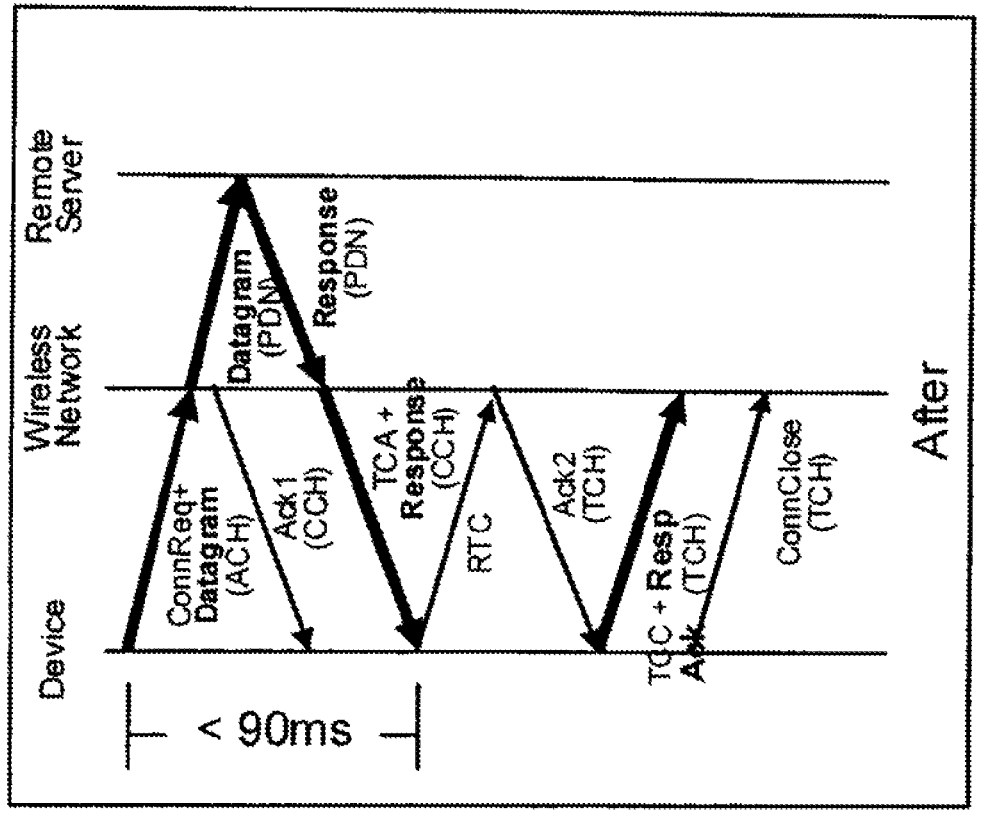
FIG. 4 shows a comparison of the delivery of the datagram and response before and after the technique of the invention being applied.
Figure 4:
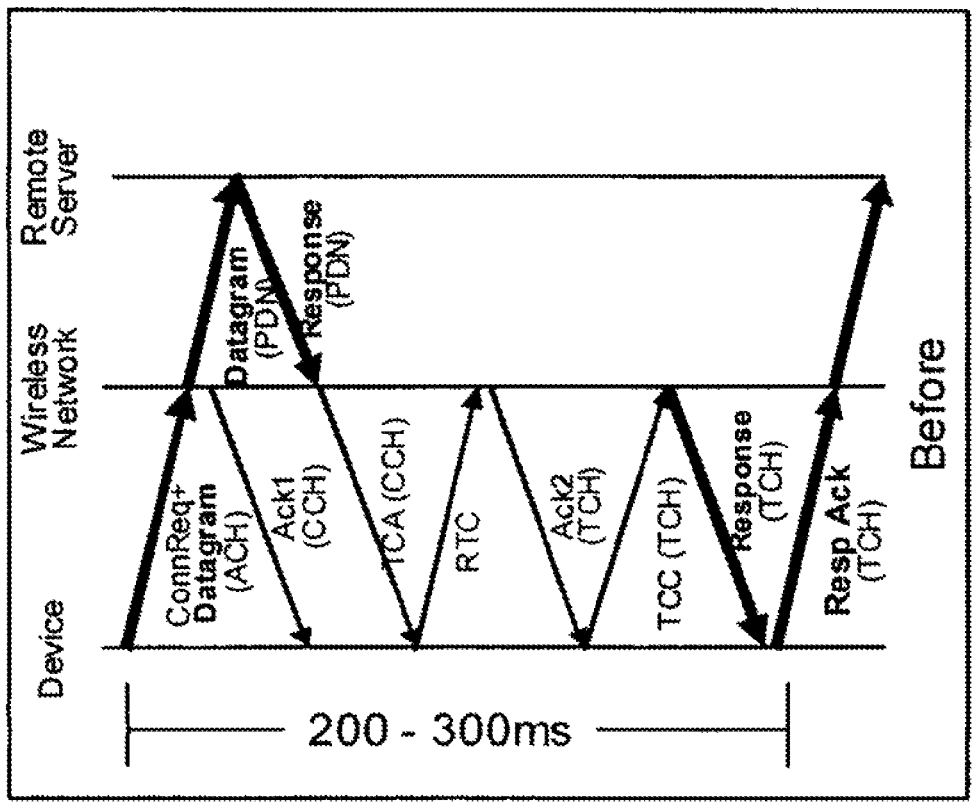

FIG. 4 shows a comparison of the delivery of the datagram and response before and after the method of the invention being applied. In the "before" diagram, the delivery of the response takes the full time to set up the connection, whereas in the "after" diagram, the response is delivered bundled with the traffic channel assignment message (TCA), thus eliminates the wait-time for the remote server response to the MS.

Figure 5:
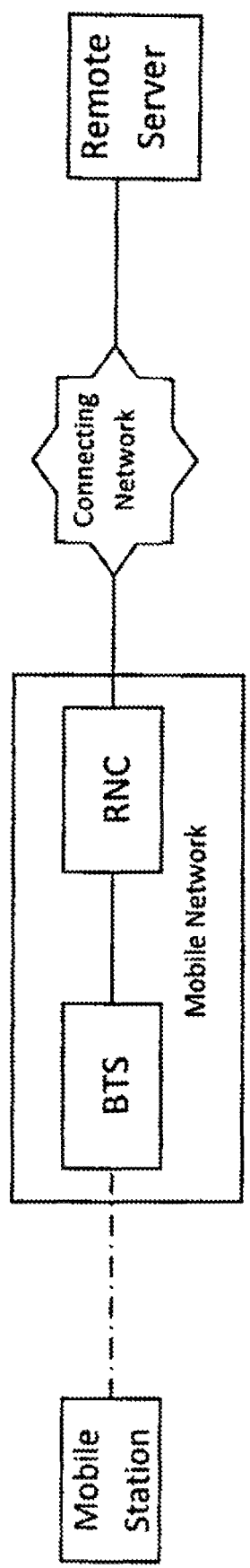
FIG. 5 shows the Mobile Wireless Device, or Mobile Station (MS), communicates with the remote server via the Mobile Network (MN).

FIG. 5 shows the Mobile Wireless Device, or Mobile Station (MS), communicates with the remote server via the Mobile Network (MN), consisting of a Radio Network Controller (RNC), or a Base Station (BTS), or both, to conduct a transaction for the delivery of the initial datagram and the response datagram.

FIG. 6 shows the entity of the present invention that contains a processing unit, a logical network interface that may include one or more physical interfaces supporting connections to the Mobile Devices, Remote Servers, Network Databases, and other network elements, and memory that is used to store various information locally in the entity.

FIG. 4 illustrates the effect of the invention contrasting between datagram delivery and the 3-way handshake before the invention is incorporated into a wireless network, such as CDMA HRPD, and the same afterwards. It is expected that the invention will reduce the datagram exchange to less than 100 milliseconds, for example, for CDMA HRPD.

Embodiments of the present invention are directed to methods and apparatus that speed up the delivery of the initial datagram from a mobile wireless device, or Mobile Station (MS) and the response to the MS from a remote server in a machine-to-machine application. The present invention enables the mobile network (MN), consisting of an Radio Network Controller (RNC), or a Base Station (BTS), or both as in FIG. 5, to recognize a class of mobile stations (MS) that support "Machine-to-Machine Applications and require "sub 100" millisecond delivery of the initial datagram from the MS to the remote server and the response datagram to the MS.

In this class of machine-to-machine applications, it is expected, that the MS always initiates the transmission of the first datagram. This datagram is carried in the IP protocol over the MN to a remote server that implements the specific machine-to-machine application. Such an application usually involves a device implementing a client application in communications with the remote server implementing a server application. The client conducts a transaction with the server that may be a 3-way hand-shake, and the initial transaction requires to be completed within a very short time.

For example, as in the case of a traffic light control, a traffic light controlling device (device herein) needs to complete such a transaction with a traffic light coordination office (traffic office herein) within 100 milliseconds, i.e., with round-trip delay fast enough, to turn the lights Green to allow privileged traffic to go through without slowing. The device may be installed on a local traffic light at a road junction, while the office may be centralized in a remote building. As it is in certain jurisdictions, public transport vehicles are assigned privileges such that when a bus approaches a junction, an on-site traffic control device, i.e., the MS, senses the approaching bus. The device sends a message to the remote traffic control server under the management of the said jurisdiction to signal that a bus is near the junction. Part of the privileges affords that the bus should proceed without slowing. The traffic office server is programmed such that it responds with an instruction to turn the light in the direction of the bus Green and in other directions Red. The bus then can cross the junction with privilege ahead of other traffic.

There are four main methods to date to support Machine-to-Machine applications such as the above over a wireless network:

First, Waiting for Connection Setup Completion: The wireless device initiates a connection setup with the wireless network, and waits for the connection to be fully set up to deliver the response from the remote server. This is shown in FIG. 2. (Note, in this method, it is assumed that the device can send the initial datagram over the ACH as uplink Data-over-Signaling, which is the more optimistic case by this method, and more efficient than waiting until the connection setup to deliver the datagram.) The connection setup can take an additional 100 to 500 milliseconds, depending on the wireless technology, before the response can be delivered to the wireless device. This is the typical design of current wireless networks and cannot meet the requirement for sub-100 ms datagram delivery.

Second, Base Station (BTS) Quick Connect: A variant of the first method is as illustrated in FIG. 3; once the device sends a connection request (which may or may not be together with uplink Data-over-Signaling), the connection is setup immediately at the BTS without involving a radio network controller (RNC), and thus eliminating the delays incurred over the backhaul network between the BTS and the central offices where the RNC is located. This has the benefit of expediting connection setup, but actual data exchange still has to wait until the completion of the connection setup. This method certainly is an improvement over the first method, however it still does not allow for sub 100 ms datagram delivery as the response from the server has to wait for the completion of the connection setup.

Third, Downlink Data-over-Signaling: The datagram exchange between the MS and the remote server can all be accomplished by sending the initial datagram from the device as a uplink Data-over-Signaling (DoS) message, which is encapsulated in a signaling message over common wireless channels, and the response from the server over downlink DoS on the common control channel (CCH), and without needing the setup of a connection between the device and the wireless network. This solution is suboptimal as the downlink DoS message fails to exploit the reciprocity of the datagram exchange, and may involve sending the downlink DoS to the whole paging area of the device. Additionally sending these datagrams over the downlink DoS is a potential waste of common signaling resources as a large number of these, and over a large paging area, may be needed.

Finally, Wireless Technology Optimization: The wireless technology may be optimized in several ways to improve connection setup speed, and the wait-time for the initial datagram to begin transmission. For example, the device may be held in a more advanced state than Dormant State, e.g., a shared-dedicated state, whereby it can immediately send the datagram over the allocated resources with minimal contention or loss of reliability. Another example is to enhance the time-division multiplexing timing characteristics of the system such that each exchange in the connection setup process is faster. This solution is possible for new wireless technologies, e.g., LTE, but it is limited in existing wireless technologies, e.g., CDMA HRPD and UMTS, because such solutions typically entail significant system redesigns and additional changes have to be incorporated into the fundamental physical layer characteristics of the system.

To overcome the limitations of the current methods as outlined above, the present invention implements the following mechanisms.

The wireless MN is able to recognize that a particular class of MS is principally engaged in machine-to-machine applications requiring sub 100 ms datagram delivery transactions. This can be done through one of several ways. First, the MS, as identified by its mobile ID, either through an ESN, MEID, IMSI, IMEI, or any device ID, belongs to this class of applications. This characteristic of the MS is provisioned and stored in memory 16 in the AAA, HLR, HSS, or any other device attribute database of the MN, i.e., servers within the MN that are either centralized or distributed that have the capability to record characteristics of MS devices and to be retrieved for use in operations. For example, in the AAA of a CDMA HRPD (or HRPD) network, an additional network or vendor specific attribute can be stored in memory 16 in the AAA, and indicating that first the MS is a machine-to-machine application device, and second another attribute recording that the MS requires "sub 100 ms datagram delivery". When the MS attaches or registers to the MN, it has to go through a registration or session setup procedure, whereby a number of MS attributes are downloaded to the MN, amongst these attributes of the MS the "machine-to-machine application" attribute and the "sub-100 ms datagram delivery" attribute are downloaded to the specific access MN from the MN servers. From that point onwards, these attributes are stored in the memory 16 in the MN. With each access attempt from registered MS in the MN, the MN then consults these attributes to determine whether to provide speed-up processing for datagram accepted and the responding packet received.

Second, the MS may acquire a specific mobile ID in the MN, and the MN through provisioning or configuration can designate the MS as in this class of applications. And similarly, the MN can consult the attributes, now in memory 16 in the MN, for machine-to-machine application and for sub-100 ms datagram delivery requirement to speed up the processing.

Or third, the MS may be designated a special class of ID, i.e., special ESN, MEID, IMSI, IMEI, or any device ID, such that when it requests data exchanges with the MN, the MN can recognize that it is in this class of applications and requires sub-100 ms datagram delivery treatment. For example, such special designations can be made using a data range of the MEID number, or string.

Finally, the MS may implement a signaling protocol attribute to explicitly inform the MN that the application supported by the initial access to the network, including the bundled signaling message and the initial datagram, indicates "Machine-to-Machine, Application" and requires "Sub 100 Millisecond Datagram and Response Delivery".

Once registered in the MN, the MS may transmit an initial datagram alone as in a data-over-signaling message, for example as in CDMA HRPD, or bundle it with a connection request message, or also bundle signaling attributes to indicate that this access to the network supports "Machine-to-Machine Application" and requires "Sub 100 Millisecond Datagram and Response Delivery". When receiving a datagram, the MN is able to record the location from where the MS had originated the initial datagram. The location may be a sector ID, cell ID, or any designation of the location of a device in a wireless, mobile, or fixed network. Additionally, for applications where the MS is not expected to move, the MN may be permanently configured with the location of the device. The MN is able to recognize that the MS requires speed-up datagram delivery after consulting with the "machine-to-machine application" attribute and "sub 100 ms datagram delivery" attributes stored in memory 16.

After the MS is recognized, the MN withholds the transmission of the traffic channel assignment message, as the connection setup message had been bundled, and waits for the return of a response datagram for the MS. The waiting-time for the MN can be controlled by a timer T_wait1 during which it inspects incoming packets and determining the intended receiver of the packet by inspecting a destination IP address, a flow label, or link ID, any other record that ties the incoming packet to a specific MS in the MN. Outside of the T_wait1 time, the MN may discard the location of the MS and thereafter any packets destined to a specific MS may need to be paged.

As the MN already has the exact location of the MS, it bundles the response within a data-over-signaling packet together with a traffic channel setup message for the MS and forwards that bundle to the MS with priority without any buffering in the rest of the MN to ensure sub-100 ms completion of the datagram transaction. For example in the CDMA HRPD network, the bundle may be sent over an asynchronous capsule or asynchronous capsule of the common control channel with the prioritized transport over the backhaul and at the nearest opportunity in accordance CDMA HRPD control channel protocols. The common control channel is usually designed in such a manner that the MN can only transmit at specific starting points in time of the time slots of the common control channel, the MN in this case takes the first time-slot where it can transmit the bundle. The MS-to-MN communications protocols are usually designed such that when the MS had originated the initial datagram it should wait for T_wait2 time period during which it listens to the common control channel of specific sector, cell, or any other location designation, in the MN.

After receiving the packet bundle from the MN, the MS will be able to process the response datagram, for example, as in the case of traffic light control to turn the lights in the direction of the bus Green and all other direction Red. In the meantime, it may compose a message in response to the datagram from the remote responding traffic control server to acknowledge the received data, though that is optional. Additionally, the device may also bundle the acknowledgement with the traffic channel completion message to the MN and transmit the bundle over the assigned uplink traffic channel to ensure completion of the CDMA HRPD protocols.

As it is usual in the MN design, the connection set up for the transaction will time out in T_wait3 period if the connection does not have data to transmit or receive in either direction for this period. For the class of devices with "machine-to-machine application" attribute and "sub 100 ms datagram delivery" attribute the T_wait3 may be set in memory 16 of the MN through provisioning or configuration to a shorter value so as to ensure that the connection is torn down faster after inactivity, and to preserve the connection resources for other applications and devices in the MN.

The present invention has the following characteristics:
The invention exploits the reciprocity of datagram exchanges between the device and the remote server, thus using the known location of the device by routing the server response immediately with no paging.
The invention treats such devices supporting Machine-to-Machine Applications and requiring Sub 100 ms Datagram and Response Delivery specially and expedites the transmission of the datagram and the response over common control channels before the ongoing connection setup completes.

The present invention is a method and mechanism for a wireless device to communicate with a remote server to send one datagram and receive the response all over the common channels of the wireless network. The initial transmission contains the datagram and an indication that the datagram shall be treated as a Sub 100 ms Datagram and Response Delivery transmission. The indication is used by the wireless network to distinguish this connection such that the response is immediately transmitted without waiting for completing the dedicated connection establishment. The response is transmitted and bundled with traffic channel assignment (TCA) message in downlink Data-over-Signaling (DoS). The response is transmitted and bundled with signaling messages of the appropriate messages involved in the connection setup procedure of the particular wireless technology, such as CDMA HRPD.

The initial datagram is transmitted in the uplink from the wireless device to a remote server over the wireless network.

The datagram is encapsulated with the connection resource request, the indication for supporting Machine-to-Machine Applications and requiring Sub 100 ms Datagram and Response Delivery, and other relevant signaling information elements. The datagram is contained in Data-over-Signaling mechanism in the wireless protocol, or a similar protocol for encapsulating user data in signaling of a wireless technology protocol. The wireless technology may be one of CDMA 2000, CDMA HRPD, 3GPP'UMTS, 3GPP LTE, 802.16, WiMAX, 802.11, or future evolved such technology.

The indication for supporting Machine-to-Machine Applications and requiring Sub 100 ms Datagram and Response Delivery may be designed as part of the wireless network protocol. In one case, the indication is through an explicit information element contained in the encapsulated information elements.

In another case, the indication may be as part of the protocol implicitly by design of the protocol of the wireless technology.

The indication for supporting Machine-to-Machine Applications and requiring Sub 100 ms Datagram and Response Delivery may be a specific implementation of the wireless network and system. It may be part of the service subscription information in the wireless network database relating to that device.

It may be achieved through marking the response packet from the remote server with a specific DSCP for indicating the required higher-priority connection type. It may be an explicit network traffic type supported for this type of devices or other types and specific device and/or user identities are determined to belong to this traffic type, which may be the only or more than one traffic type in the wireless network and system.

The wireless network processes the indication for supporting Machine-to-Machine Applications and requiring Sub 100 ms Datagram and Response Delivery and marks that the connection resources serving the device such that it is treated as a distinct connection type. The wireless network shall store information of the current location of the device of the connection type. The location of the device shall be at the granularity of being able to transmit data to the device over common channels or connection channels of a single cell or sector. Transmitting data to devices of the connection type shall be without further need for paging. For the connection type, the wireless network ensures that any data received for the device shall not wait for the completion of the connection setup.

The response or responses from the remote server to the device are transmitted in the downlink. If the wireless network is still in the process of setting up the connection for the device, the wireless network shall recognize connection as marked for this distinct connection type. The wireless network immediately encapsulates the received downlink datagram with traffic channel assignment (TCA) message in CDMA HRPD, or similar message in the particular wireless technology, for the device.

The wireless network transmits the encapsulated data over the available common control or traffic channel, whichever is available. If the wireless network has already set up the connection, the response or responses are sent over the connection resources in the downlink.

The device, on receiving the response, responds with a response acknowledgement. Similar to the initial datagram, the acknowledgement can be sent on DoS if the connection setup is not complete. If the connection is complete, the acknowledgement may also be sent on the connection resources in the uplink. Immediately after the response acknowledgement, the device sends a connection close message as soon as there is no data to exchange and thus free up the relevant connection resources.

In an CDMA HRPD system, where the device is in a Dormant State, where the RTD time savings will be in the delay from the time the datagram is received from the device and the time that the DO connection is set up. In an CDMA HRPD system, where the device is in an Idle State, where the RTD time savings will be in part of the delay from the time the datagram is received from the device and the time that the DO connection is set up, where the datagram will need to be forwarded on once the wireless network had set up an A 10 connection.

In a 3GPP UMTS system, where the device is in a RRC-_FACH state the savings in the delay from the time the datagram is received over the RACH and the time the RRC connection radio link is setup. In a 3GPP UMTS system, where the device is in a RRC_IDLE state the savings in part of the delay from the time the datagram is received over the RACH and the time the RRC connection radio link is setup. In other radio access technologies and systems, including 802.16 WiMAX, 802.11 WiFi, CDMA 2000, and Flash-OFDM either in an equivalent Idle State, Dormant State, or Hold State, transitioning to the equivalent Active State.

This invention lends Ericsson a competitive advantage in supporting the evolved, ubiquitous, connected wireless IP networks for machine-to-machine (M2M) applications.

ABBREVIATIONS
3GPP Third Generation Partnership Project
3GPP-2 Third Generation Partnership Project 2
ACH (Random) Access Channel
Ack Acknowledgement
BTS Base Station
CCH Common Control Channel
CDMA Code Division Multiple Access
CDMA 2000 CDMA 2000 Third Generation Wireless Technology
DoS Data-over-Signaling
EVDO Evolution Data-Optimized
HRPD High-Rate Packet Data (this is the formal name in 3GPP2 standards body for CDMA EVDO)
LTE (3GPP) Long Term Evolution
M2M Machine-to-machine
OFDM Orthogonal Frequency Division Multiplexing
PDN Packet Data Network
RAN Radio Access Network
RNC Radio Network Controller
RTC Reverse Traffic Channel
RTD Round Trip Delay
SDB Short Data Burst
TCA Traffic Channel Assignment
TCC Traffic Channel Complete
TCH (Forward) Traffic Channel
UMTS (3GPP) Universal Mobile Telecommunications Systems
WCDMA Wide-band CDMA Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A method of an entity in a wireless telecommunications network having a mobile station and a remote server comprising the steps of:

receiving, at a network interface, a datagram from the mobile station piggy-backed on an initial request for a connection setup;

storing, by a processing unit, the mobile station's location in a memory; and sending a response received from the remote server regarding the datagram to the mobile station from the network interface using the mobile station's stored location before the connection setup completes and without a need for paging the mobile station, wherein by sending the response before the connection setup completes a delay incurred by waiting for the connection setup is avoided.

2. The method of claim 1 including the step of forwarding the datagram to the remote server from the network interface, and receiving the response from the remote server by the network interface.

3. The method of claim 1 wherein the sending step includes the step of sending the response with a traffic channel assignment message from the network interface to the mobile station.

4. The method of claim 3 including the steps of the processing unit:

storing in the memory the attributes for a corresponding mobile station (MS) session ID through provisioning or configuration;

recognizing that the MS session ID supports Machine-to-Machine Application; and recognizing that the MS session ID requires Sub 100 Millisecond Datagram and Response Delivery.

5. The method of claim 3 including the step of the processing unit withholding the traffic channel assignment message to ensure the response is bundled with the traffic channel assignment message.

6. The method of claim 3 including the step of ensuring with the processing unit that any data received for the mobile station does not wait for the connection with the mobile station to be established.

7. The method of claim 6 including the step of receiving at the network interface a response acknowledgment from the mobile station after the mobile station has received the response.

8. The method of claim 7 including the step of receiving a connection close message at the network interface from the mobile device when there is no longer any data to exchange.

9. The method of claim 1 wherein the sending the response step includes the step of bundling together the response with the traffic channel assignment message for transmission over a forward link common control channel, or a downlink control channel, or a shared downlink control channel.

10. The method of claim 1 including the steps of the processing unit:

retrieving from a network database of the mobile station a Machine-to-Machine Application attribute;

retrieving from the network database of the mobile station a Sub 100 Millisecond Datagram and Response Delivery attribute;

storing the Machine-to-Machine Application attribute and the Sub 100 Millisecond Datagram and Response Delivery attribute in the memory; and recognizing that the mobile station supports Machine-to-Machine Application and requires Sub 100 Millisecond Datagram and Response Delivery.

11. The method of claim 1 including the steps of the processing unit:

recognizing that an ESN, MEID, IMSI, or IMEI device ID designates that the MS supports Machine-to-Machine Application and requires Sub 100 Millisecond Datagram and Response Delivery.

12. The method of claim 1 wherein the step of receiving a datagram at the network interface includes the steps of:

a wireless protocol or technology providing signaling attributes in the connection request to designate that the MS access request to the network supports Machine-to-Machine Application and requires Sub 100 Millisecond Datagram and Response Delivery, and receiving a signaling indication that the datagram shall be treated as Machine-to-Machine Application and requires Sub 100 Millisecond Datagram and Response Delivery along with the datagram.

13. The method of claim 1 wherein the receiving a datagram at the network interface step includes the step of receiving at the network interface the datagram encapsulated with a connection resource request.

14. The method of claim 1 wherein the receiving a datagram at the network interface step includes the step of receiving the datagram at the network interface encapsulated with a connection resource request and the Machine-to-Machine Application and requires Sub 100 Millisecond Datagram and Response Delivery indication.

15. An entity of a wireless telecommunications network having a mobile station and a remote server comprising:

a network interface for receiving a datagram from the mobile station piggy-backed on an initial request for a connection setup;

a memory in communication with the network interface; and a processing unit in communication with the memory for storing the mobile station location in the memory, and for sending a response received from the remote server, regarding the datagram, to the mobile station from the network interface using the mobile station's stored location before the connection setup completes and without a need for paging the mobile station, wherein by sending the response before the connection setup completes a delay incurred by waiting for the connection setup is avoided.

16. The entity of claim 15 wherein the network interface forwards the datagram to the remote server, and receives the response from the remote server.

17. The entity of claim 15 wherein the network interface sends the response with a traffic channel assignment message to the mobile station.

18. The entity of claim 17 wherein the network interface bundles together the response with the traffic channel assignment message for transmission over a forward link common control channel, or a downlink control channel, or a shared downlink control channel.

19. The entity of claim 17 wherein the processing unit:

retrieves from a network database of the mobile station a Machine-to-Machine Application attribute;

retrieves from the network database of the mobile station a Sub 100 Millisecond Datagram and Response Delivery attribute;

stores the Machine-to-Machine Application attribute and the Sub 100 Millisecond Datagram and Response Delivery attribute in memory; and recognizes that the mobile station supports Machine-to-Machine Application and requires Sub 100 Millisecond Datagram and Response Delivery.

20. The entity of claim 17 wherein the processing unit ensures that any data received for the mobile station does not wait for the connection with the mobile station to be established.

21. The entity of claim 20 wherein the network interface receives a response acknowledgment from the mobile station after the mobile station has received the response.

22. The entity of claim 21 wherein the network interface receives a connection close message from the mobile station when there is no longer any data to exchange.

23. The entity of claim 15 wherein the processing unit stores the attributes for the mobile station (MS) session ID in the memory through provisioning or configuration; recognizes that the MS session ID supports Machine-to-Machine Application and recognizes that the MS session ID requires Sub 100 Millisecond Datagram and Response Delivery.

24. The entity of claim 15 wherein the processing unit recognizes that an ESN, MEID, IMSI, or IMEI ID designates that the MS supports Machine-to-Machine Application and requires Sub 100 Millisecond Datagram and Response Delivery.

25. The entity of claim 15 wherein the processing unit withholds the traffic channel assignment message to ensure the response is bundled with the traffic channel assignment message.

26. The entity of claim 15 wherein the network interface receives signaling attributes indicating that the datagram shall be treated as Machine-to-Machine Application and requires Sub 100 Millisecond Datagram and Response Delivery along with the datagram.

27. The entity of claim 26 wherein the network interface receives the datagram encapsulated with a connection resource request.

* * * * *